(12) United States Patent
Calvarese et al.

(10) Patent No.: US 10,037,608 B2
(45) Date of Patent: Jul. 31, 2018

(54) ARRANGEMENT FOR, AND METHOD OF, DETECTING MOTION OF A TARGET IN A VENUE HAVING MULTIPLE REGIONS

(71) Applicant: SYMBOL TECHNOLOGIES, LLC, Lincolnshire, IL (US)

(72) Inventors: Russell Calvarese, Stony Brook, NY (US); Charles G. Lauria, Miller Place, NY (US); Richard J. Lavery, Huntington, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 123 days.

(21) Appl. No.: 15/350,286

(22) Filed: Nov. 14, 2016

(65) Prior Publication Data

US 2018/0137627 A1 May 17, 2018

(51) Int. Cl.
*G06T 7/00* (2017.01)
*G06T 7/20* (2017.01)
*H04N 7/18* (2006.01)
*G06K 9/00* (2006.01)

(52) U.S. Cl.
CPC ........ *G06T 7/2033* (2013.01); *G06K 9/00771* (2013.01); *H04N 7/183* (2013.01)

(58) Field of Classification Search
CPC .............................. G06T 7/20; G06K 9/00771
USPC .......................................................... 348/143
See application file for complete search history.

(56) References Cited

U.S. PATENT DOCUMENTS

2009/0060352 A1* 3/2009 Distante ............. A63B 24/0021
382/224

* cited by examiner

*Primary Examiner* — Jeffery Williams

(57) ABSTRACT

An array of light sensors arranged along mutually orthogonal sensor rows and sensor columns is exposed to return light from a target over successive frames. The array is subdivided into mutually orthogonal zones, each having a sub-plurality of sensor rows and sensor columns. Each row of zones is scanned multiple times to produce output light intensity values, which are averaged to obtain an average zonal value for each zone for each frame. The average zonal value over the successive frames is simultaneously averaged with slow and fast response characteristics to obtain respective slow and fast response values for each zone, which are then compared to obtain a difference value for each zone. Motion of the target in any region of a venue is indicated when the difference value between the fast and slow response values in a corresponding zone exceeds a threshold value.

15 Claims, 4 Drawing Sheets

ARRANGEMENT FOR, AND METHOD OF, DETECTING MOTION OF A TARGET IN A VENUE HAVING MULTIPLE REGIONS

BACKGROUND OF THE INVENTION

The present disclosure relates generally to an arrangement for, and a method of, detecting motion of one or more targets in a venue having multiple regions.

Motion detection is widely used in many domestic and commercial applications, such as triggering surveillance cameras, controlling lighting, monitoring the movement of products and/or objects and/or people, optimizing energy usage, etc. Generally speaking, low cost motion detection employs passive infrared (PIR) sensors that are sensitive to radiation at infrared wavelengths. In a venue having multiple regions in which motion of a target is to be detected, either multiple PIR sensors are used, or a single PIR sensor is used in common with multiple Fresnel lenses. A single PIR sensor precludes the ability to determine in which region the motion occurred. When this ability is desired, it has proven relatively expensive to supply and install multiple PIR sensors, and to focus multiple lenses on the respective multiple regions of the venue.

It is also known to install smart cameras with local processing and Ethernet cameras with backend processing to detect target motion in multiple regions of the venue. These cameras capture video information from all the regions, extract the captured video information for each region, and process the extracted video information from each region, typically executing complex algorithms, to determine which region contains motion. In practice, such cameras are relatively costly to supply and install, are relatively large in size, consume high amounts of electrical power, and often require an initial calibration during setup, and subsequent calibrations during any subsequent changes in the venue. In addition, Ethernet cameras require costly interfacing network circuitry, significant network bandwidth, and additional network server resources to process the video information.

Accordingly, there is a need to reliably detect motion at low cost in multiple regions of a venue with the ability to distinguish in which region there was motion.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
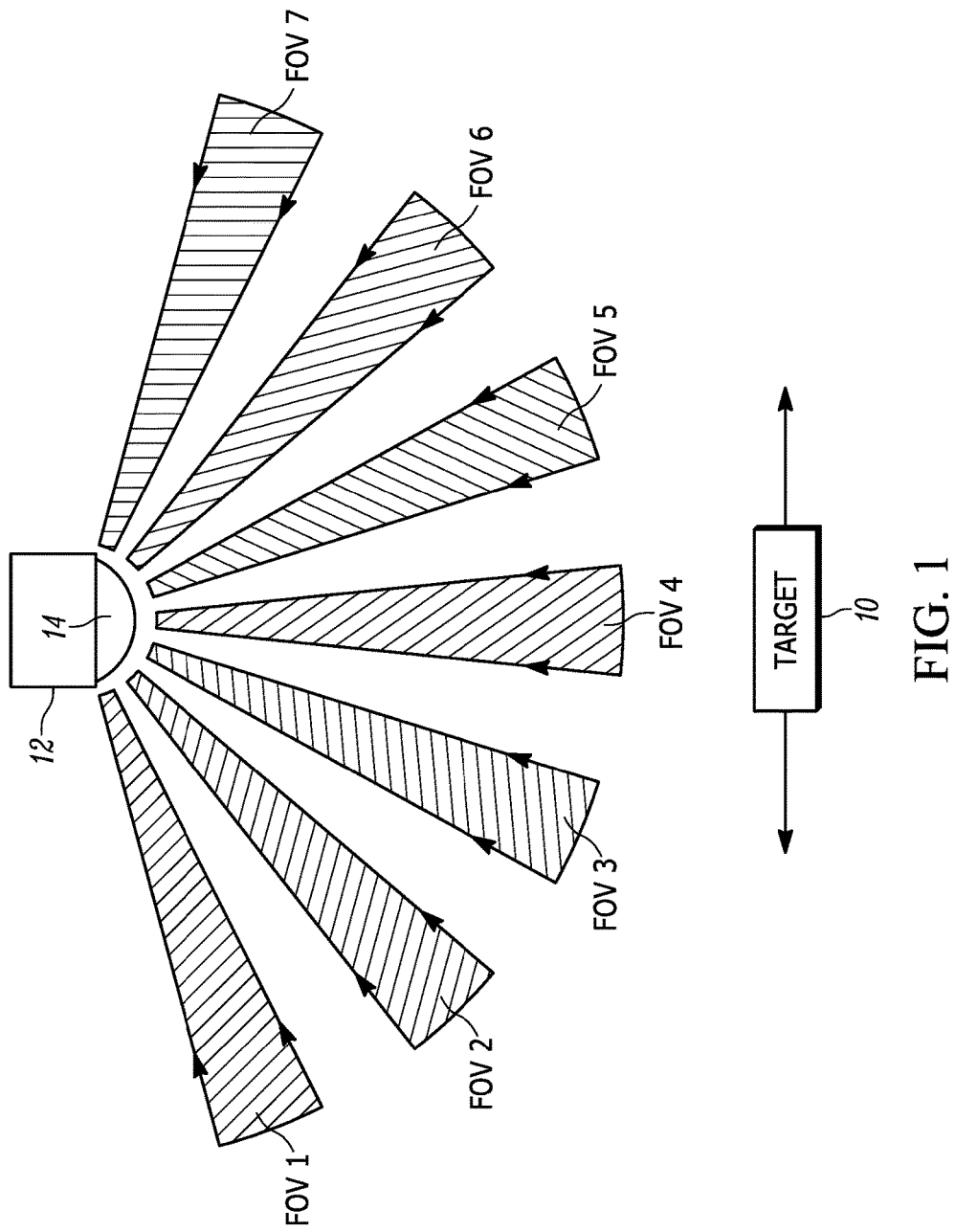
FIG. 1 is a top plan view of an imager having multiple fields of view that respectively cover multiple regions of a venue in which motion of a target is to be detected in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of this disclosure relates to an arrangement for detecting motion of one or more targets, such as products and/or objects and/or people, in a venue, such as a retail, factory, warehouse, or home environment having multiple regions in which each target may move. The arrangement includes an imaging system having a two-dimensional array of light sensors, also known as pixels, exposable to return light from each target over successive frames. The sensors may be color or monochrome (black-and-white) sensors. The sensors are arranged along a plurality of parallel sensor rows, each sensor row extending along a horizontal direction, and along a plurality of parallel sensor columns, each sensor column extending along a vertical direction that is perpendicular to the horizontal direction. The array is sub-divided into a plurality of zones arranged along a plurality of parallel zone rows, each zone row extending along the horizontal direction, and along a plurality of parallel zone columns, each zone column extending along the vertical direction. Each zone has a sub-plurality of the sensor rows and a sub-plurality of the sensor columns. The zones have corresponding fields of view that look over the regions of the venue.

The arrangement further includes a control system for scanning each zone row along a plurality of scan lines extending along the horizontal direction, for reading output analog or digital light intensity values from the sensors in each zone over each frame, and for averaging the output light intensity values in each zone to obtain an average zonal value for each zone for each frame. The control system is also operative for simultaneously averaging the output average zonal value for each zone over the successive frames with a slow response characteristic to obtain a slow response value for each zone, and with a fast response characteristic to obtain a fast response value for each zone. Preferably, each response characteristic is a rolling or running average. The control system compares the slow and fast response values to obtain a difference value for each zone, and indicates that motion of the target has occurred in any of the regions where the difference value between the fast and slow response values in the corresponding zone exceeds a predetermined threshold value.

Advantageously, the control system includes a horizontal synchronization detection circuit for synchronizing a start of each scan line, a frame synchronization detection circuit for synchronizing a start of each frame, and a sample and hold circuit for sampling the output light intensity values from the sensors in each zone over each frame, and for holding the sampled values for a predetermined period of time.

A further aspect of this disclosure is directed to a method of detecting motion of a target in a venue having multiple regions. The method is performed by exposing a two-dimensional array of light sensors to return light from the target over successive frames; by arranging the sensors along a plurality of parallel sensor rows, each sensor row extending along a horizontal direction, and along a plurality of parallel columns, each sensor column extending along a vertical direction that is perpendicular to the horizontal direction; and by subdividing the array into a plurality of zones arranged along a plurality of parallel zone rows, each zone row extending along the horizontal direction, and along a plurality of parallel zone columns, each zone column extending along the vertical direction. Each zone has a sub-plurality of the sensor rows and a sub-plurality of the sensor columns. The zones have corresponding fields of view that look over the regions of the venue.

The method is further performed by scanning each zone row along a plurality of scan lines extending along the horizontal direction; by reading output analog or digital light intensity values from the sensors in each zone over each frame; by averaging the output light intensity values in each zone to obtain an average zonal value for each zone for each frame; by simultaneously averaging the output average zonal value for each zone over the successive frames with a slow response characteristic to obtain a slow response value for each zone, and with a fast response characteristic to obtain a fast response value for each zone, by comparing the slow and fast response values to obtain a difference value for each zone, and by indicating that motion of the target has occurred in any of the regions where the difference value between the fast and slow response values in the corresponding zone exceeds a predetermined threshold value.

In accordance with this disclosure, multiple PIR sensors, or a single PIR sensor with multiple Fresnel lenses, are not used. In addition, the imaging system is advantageously a low cost analog output camera, whose resolution is low, e.g., of sub-megapixel size; and the control system advantageously includes a low cost microprocessor or controller, preferably embedded with the camera. The low cost controller preferably has a low or medium speed analog-to-digital converter, and only a small amount of memory, because it only needs to hold the aforementioned fast and slow running averages for each zone.

Turning now to the drawings, reference numeral 10 in FIG. 1 generally depicts one or more targets, e.g., products and/or objects and/or people, movable in a venue having multiple regions. An arrangement for detecting motion of the target 10 includes an imaging system that has an imager 12, e.g., a two-dimensional, solid-state, device, such as a charge coupled device (CCD) or a complementary metal oxide semiconductor (CMOS) device; and an optical assembly or lens 14 for capturing return light scattered and/or reflected from each target 10, and for projecting the captured return light onto the imager 12 to initiate capture of an image of each target 10. As described below, the imaging system has multiple fields of view (FOVs), a representative upper row of which being identified as FOV 1, FOV 2, FOV 3, FOV 4, FOV 5, FOV 6, and FOV 7 in FIG. 1, and look out over the multiple regions of the venue to detect motion of the target 10 in any one or more of these regions. It will be understood that there typically are multiple rows of such fields of view that are located below the illustrated upper row.

Figure 2:
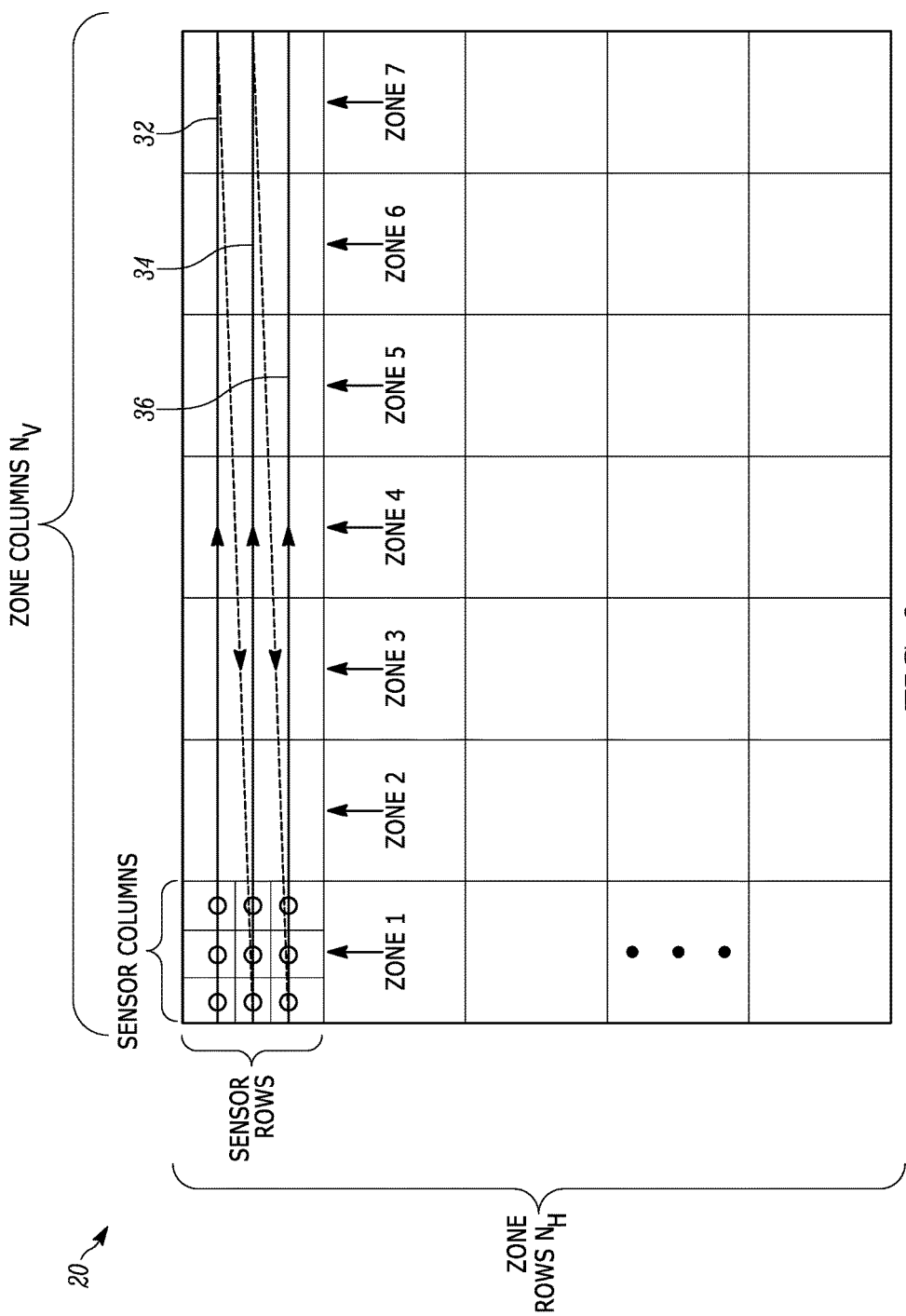
FIG. 2 is an enlarged, diagrammatic view of an array of the imager of FIG. 1.

As best shown in FIG. 2, the imager 12 has a two-dimensional array 20 of image sensors, also known as pixels, that are exposed to the return light from each target 10 over successive frames. The imager 12 may typically operate at a frame rate of 30-60 frames per second or Hertz. The sensors are arranged along a plurality of parallel sensor rows, each sensor row extending along a horizontal direction, and along a plurality of parallel sensor columns, each sensor column extending along a vertical direction that is perpendicular to the horizontal direction. The array 20 may advantageously have a resolution of 1024 pixels×768 pixels, or any other resolution, preferably of sub-megapixel resolution to reduce costs. The sensors are preferably monochrome (black-and-white) sensors for low cost, but may also be color sensors.

The array 20 is subdivided into a plurality of zones, representative ones of which are identified in FIG. 2 as Zone 1, Zone 2, Zone 3, Zone 4, Zone 5, Zone 6 and Zone 7, each of said zones respectively corresponding to FOV 1, FOV 2, FOV 3, FOV 4, FOV 5, FOV 6, and FOV 7 in FIG. 1. FIG. 2 depicts 5 horizontal rows of zones ($N_H$=5) and 7 vertical columns of zones ($N_V$=7). It will be understood that the illustrated 5×7 array of zones was drawn to simplify the drawings since, in practice, there may be more or fewer rows of zones and more or fewer columns of zones. Each zone has a sub-plurality of the sensor rows and a sub-plurality of the sensor columns. As shown, each zone has 3 sensor rows of pixels and 3 sensor columns of pixels. It will be understood that this is merely exemplary, because more or fewer sensor rows and sensor columns of pixels may be included in each zone.

Figure 3:
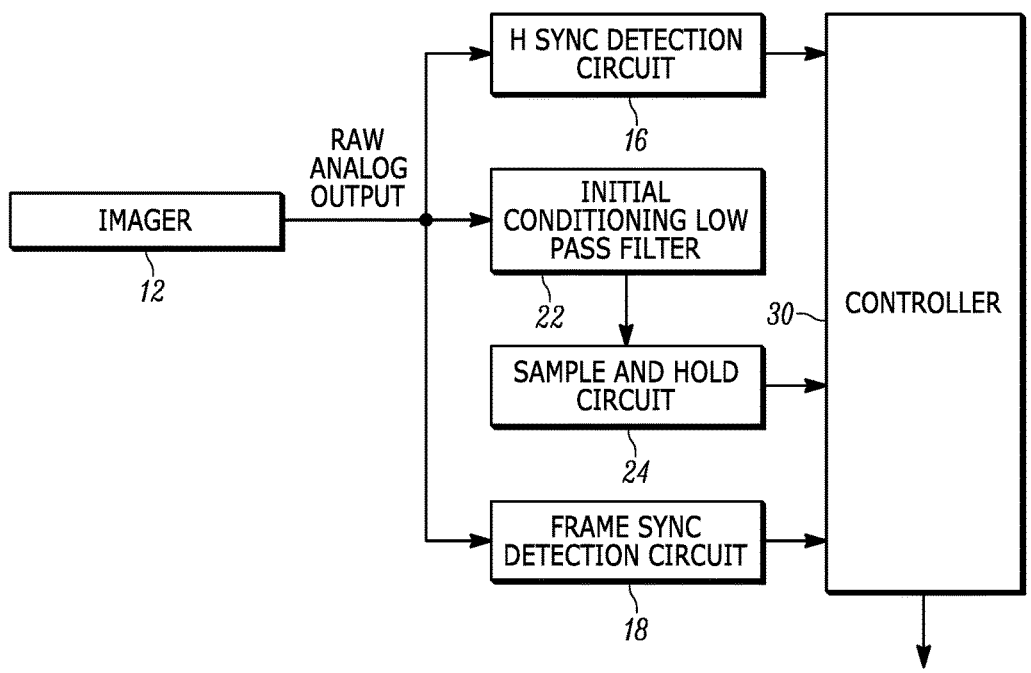
FIG. 3 is a block diagram depicting components of the arrangement for detecting target motion in accordance with the present disclosure.
Figure 4:
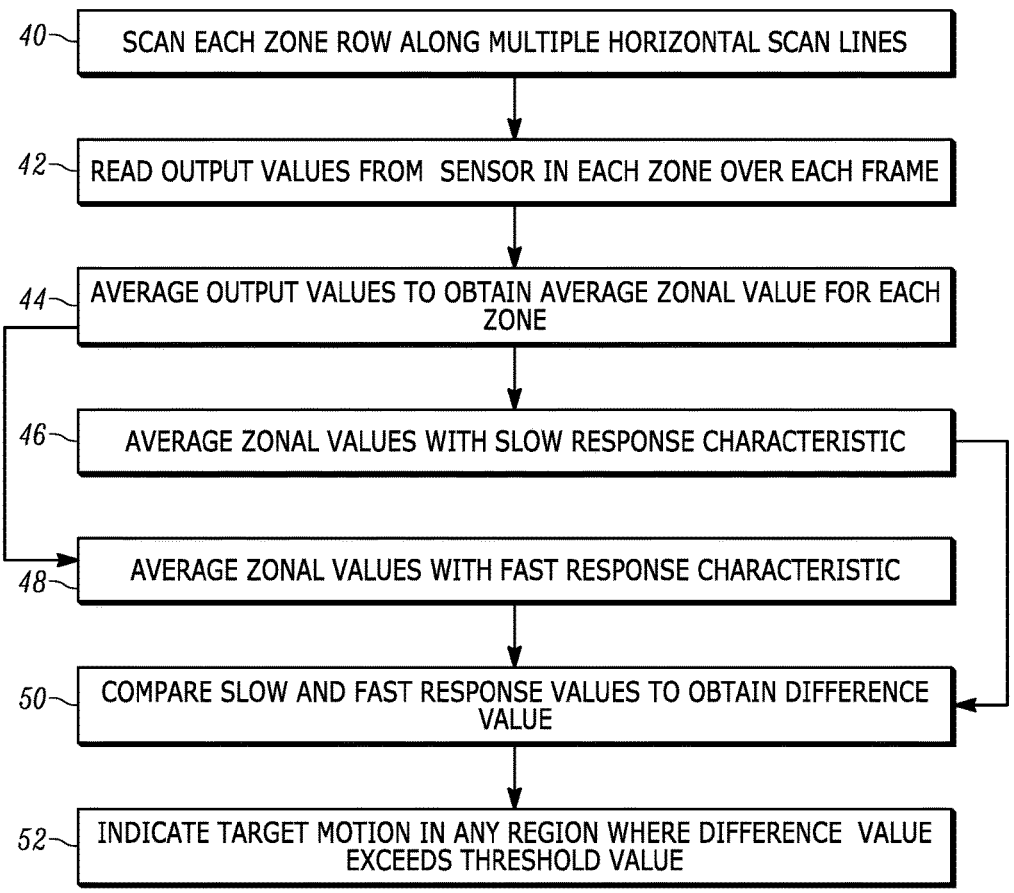
FIG. 4 is a flow chart depicting steps performed in a method of detecting target motion in accordance with the present disclosure.

As shown in FIG. 3, a control system is operatively connected to the imager 12. The control system includes a programmed microprocessor or controller 30 operative, as shown in the flow chart of FIG. 4, for scanning each horizontal row of zones along a plurality of generally parallel scan lines 32, 34, and 36 a plurality of times, e.g., 3 times, along the horizontal direction in step 40. It will be understood that this is merely exemplary, because more or fewer than three horizontal scan lines may be used. In step 42, the controller 30 reads output analog or digital light intensity values from the sensors in each zone over each frame.

In operation, in step 44, the control system averages the output light intensity values in each zone to obtain an average zonal value for each zone for each frame. Thus, in the illustrated example of FIG. 2, there are nine sensors in each zone, and their nine outputs are summed and divided by nine to obtain the average zonal value for each zone. This process is repeated for every successive frame.

Then, in step 46, the control system averages the average zonal value for each zone over the successive frames with a slow response characteristic to obtain a slow response value for each zone. Simultaneously, in step 48, the control system averages the average zonal value for each zone over the successive frames with a fast response characteristic to obtain a fast response value for each zone. Each response characteristic or function is analogous to the action of a low pass filter, in which a slow response filter has a lower cutoff frequency than a fast response filter. Each such response characteristic computes a running or rolling average over the successive frames.

Then, in step 50, the control system compares the slow and fast response values to obtain a difference value for each zone. Preferably, the controller 30 only needs limited processing power and limited memory to handle the slow and fast response values. In step 52, the control system will indicate that motion of the target 10 has occurred in any of the regions where the difference value between the fast and slow response values in the corresponding zone exceeds a predetermined threshold value.

As shown in FIG. 3, the control system includes a horizontal synchronization (H sync) detection circuit 16 for synchronizing a start of each horizontal scan line 32, 34, and 36; a frame synchronization detection circuit 18 for synchronizing a start of each frame; and a sample and hold circuit 24 for sampling the output analog or digital light intensity values from the sensors in each zone over each frame, and for holding the sampled values for a predetermined period of time. Advantageously, an initial conditioning low pass filter 22 conditions the output light intensity values prior to arrival at the sample and hold circuit 24.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An arrangement for detecting motion of a target in a venue having multiple regions, the arrangement comprising:
an imaging system having a two-dimensional array of light sensors exposable to return light from the target over successive frames, the sensors being arranged along a plurality of parallel sensor rows, each sensor row extending along a horizontal direction, and along a plurality of parallel sensor columns, each sensor column extending along a vertical direction that is perpendicular to the horizontal direction,
the array being subdivided into a plurality of zones arranged along a plurality of parallel zone rows, each zone row extending along the horizontal direction, and along a plurality of parallel zone columns, each zone column extending along the vertical direction, each zone having a sub-plurality of the sensor rows and a sub-plurality of the sensor columns, the zones having corresponding fields of view that look over the regions of the venue; and
a control system for scanning each zone row along a plurality of scan lines extending along the horizontal direction, for reading output light intensity values from the sensors in each zone over each frame, for averaging the output light intensity values in each zone to obtain an average zonal value for each zone for each frame, for simultaneously averaging the output average zonal value for each zone over the successive frames with a slow response characteristic to obtain a slow response value for each zone and with a fast response characteristic to obtain a fast response value for each zone, for comparing the slow and fast response values to obtain a difference value for each zone, and for indicating that motion of the target has occurred in any of the regions where the difference value between the fast and slow response values in the corresponding zone exceeds a predetermined threshold value.

2. The arrangement of claim 1, wherein the control system includes a horizontal synchronization detection circuit for synchronizing a start of each scan line.

3. The arrangement of claim 1, wherein the control system includes a frame synchronization detection circuit for synchronizing a start of each frame.

4. The arrangement of claim 1, wherein the control system includes a sample and hold circuit for sampling the output light intensity values from the sensors in each zone over each frame, and for holding the sampled values for a predetermined period of time.

5. The arrangement of claim 1, wherein each response characteristic is a running average.

6. The arrangement of claim 1, wherein the sensors are monochrome sensors.

7. The arrangement of claim 1, wherein the imaging system includes an imager having a resolution of sub-megapixel size.

8. The arrangement of claim 1, wherein the control system includes a controller of limited processing power and limited memory.

9. A method of detecting motion of a target in a venue having multiple regions, the method comprising:
exposing a two-dimensional array of light sensors to return light from the target over successive frames;
arranging the sensors along a plurality of parallel sensor rows, each sensor row extending along a horizontal direction, and along a plurality of parallel sensor columns, each sensor column extending along a vertical direction that is perpendicular to the horizontal direction;
subdividing the array into a plurality of zones arranged along a plurality of parallel zone rows, each zone row extending along the horizontal direction, and along a plurality of parallel zone columns, each zone column extending along the vertical direction, each zone having a sub-plurality of the sensor rows and a sub-plurality of the sensor columns, the zones having corresponding fields of view that look over the regions of the venue;
scanning each zone row along a plurality of scan lines extending along the horizontal direction;
reading output light intensity values from the sensors in each zone over each frame;
averaging the output light intensity values in each zone to obtain an average zonal value for each zone for each frame;
averaging the output light intensity values in each zone to obtain an average zonal value for each zone for each frame;
simultaneously averaging the average zonal value for each zone over the successive frames with a slow response characteristic to obtain a slow response value for each zone, and with a fast response characteristic to obtain a fast response value for each zone;
comparing the slow and fast response values to obtain a difference value for each zone; and
indicating that motion of the target has occurred in any of the regions where the difference value between the fast and slow response values in the corresponding zone exceeds a predetermined threshold value.

10. The method of claim 9, and synchronizing a start of each scan line.

11. The method of claim 9, and synchronizing a start of each frame.

12. The method of claim 9, and sampling the output light intensity values from the sensors in each zone over each frame, and holding the sampled values for a predetermined period of time.

13. The method of claim 9, and configuring each response characteristic as a running average.

14. The method of claim 9, and configuring the sensors as monochrome sensors.

15. The method of claim 9, and configuring the array with a resolution of sub-megapixel size.

* * * * *